(12) United States Patent
Toyohira et al.

(10) Patent No.: US 10,457,110 B2
(45) Date of Patent: Oct. 29, 2019

(54) VEHICLE SUSPENSION SYSTEM

(71) Applicant: HONDA MOTOR CO., LTD., Tokyo (JP)

(72) Inventors: Tomoya Toyohira, Wako (JP); Takafumi Kato, Wako (JP); Atsuhiko Yoneda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 148 days.

(21) Appl. No.: 15/595,269

(22) Filed: May 15, 2017

(65) Prior Publication Data

US 2018/0134111 A1    May 17, 2018

(30) Foreign Application Priority Data

Mar. 16, 2016   (JP) .................................. 2016-052876

(51) Int. Cl.
| | |
|---|---|
| *B60G 7/02* | (2006.01) |
| *B60G 17/02* | (2006.01) |
| *B60G 15/06* | (2006.01) |
| *B60G 15/02* | (2006.01) |

(52) U.S. Cl.
CPC ............. *B60G 17/02* (2013.01); *B60G 15/02* (2013.01); *B60G 15/065* (2013.01); *B60G 17/021* (2013.01); *B60G 2202/152* (2013.01); *B60G 2202/322* (2013.01); *B60G 2202/413* (2013.01); *B60G 2202/416* (2013.01); *B60G 2202/432* (2013.01); *B60G 2500/10* (2013.01); *B60G 2500/30* (2013.01); *B60G 2600/22* (2013.01)

(58) Field of Classification Search
USPC .......................................................... 701/37
See application file for complete search history.

(56) References Cited

U.S. PATENT DOCUMENTS

| | | | |
|---|---|---|---|
| 6,683,533 | B1 | 1/2004 | Ashihara et al. |
| 7,406,371 | B2 | 7/2008 | Izawa et al. |
| 2003/0191573 | A1 | 10/2003 | Beyer et al. |

(Continued)

FOREIGN PATENT DOCUMENTS

| | | |
|---|---|---|
| JP | H04237617 A | 8/1992 |
| JP | H0692159 A | 4/1994 |

(Continued)

OTHER PUBLICATIONS

Notice of Reasons of Rejection for Japanese Patent Application No. 2016-052876, dated Nov. 14, 2017, 7 pages.

(Continued)

*Primary Examiner* — Tyler D Paige
(74) *Attorney, Agent, or Firm* — Armstrong Teasdale LLP (57) ABSTRACT

A vehicle suspension system (3) is provided that allows attention eliciting information such as rumble strips, bumps and road markers to be conveyed to the vehicle operator substantially without detracting from the performance of the vehicle suspension system. A control unit (10) determines if a prescribed warning condition exists according to vehicle information and/or road surface information acquired by an information acquiring unit, and performs a warning control including an extending and retracting movement of the actuator interposed between an sprung member (8) and an unsprung member (9) of the vehicle at a prescribed frequency when the warning condition is determined.

4 Claims, 6 Drawing Sheets

(56) References Cited

U.S. PATENT DOCUMENTS

| | | | |
|---|---|---|---|
| 2004/0024515 A1* | 2/2004 | Troupe | B60K 28/10 701/93 |
| 2005/0236210 A1* | 10/2005 | Kawazoe | B60Q 9/008 180/272 |
| 2006/0047387 A1 | 3/2006 | Izawa et al. | |
| 2010/0250065 A1* | 9/2010 | Kelly | B60G 17/016 701/37 |
| 2013/0057399 A1* | 3/2013 | Panse | B60G 17/017 340/440 |
| 2013/0158799 A1* | 6/2013 | Kamimura | B60G 17/0165 701/40 |
| 2013/0197754 A1* | 8/2013 | Lee | B60G 17/0157 701/37 |
| 2014/0195112 A1* | 7/2014 | Lu | B60G 17/015 701/37 |
| 2017/0136842 A1* | 5/2017 | Anderson | B60G 17/016 |
| 2017/0217276 A1 | 8/2017 | Banvait et al. | |
| 2018/0134111 A1* | 5/2018 | Toyohira | B60G 17/021 |

FOREIGN PATENT DOCUMENTS

| | | |
|---|---|---|
| JP | 2000251171 A | 9/2000 |
| JP | 2001067600 A | 3/2001 |
| JP | 2001311452 A | 11/2001 |
| JP | 2001341599 A | 12/2001 |
| JP | 2003534195 A | 11/2003 |
| JP | 2005193774 A | 7/2005 |
| JP | 2005257451 A | 9/2005 |
| JP | 2006044523 A | 2/2006 |
| JP | 2006221463 A | 8/2006 |
| JP | 2009061963 A | 3/2009 |
| JP | 2012111357 A | 6/2012 |

OTHER PUBLICATIONS

Notice of Reasons for Refusal for JP Application No. 2018-133867, dated Jul. 30, 2019, 6 pages.

* cited by examiner

VEHICLE SUSPENSION SYSTEM

TECHNICAL FIELD

The present invention relates to a vehicle suspension system.

BACKGROUND ART

It is known to control the vertical vibration of the sprung member of a vehicle by interposing an actuator between the sprung member and the unsprung member, and causing a relative movement between the two members by producing a drive force with the actuator according to the skyhook theory. See JP2001-311452A, for instance.

However, when the vertical vibration of the sprung member is extensively controlled by controlling such an actuator, the vibrations which are caused by rumble strips and bumps formed on the surface for the purpose of eliciting the attention of the vehicle operator may be controlled to such an extent that the vehicle operator's attention may not be elicited as intended.

SUMMARY OF THE INVENTION

In view of such problems of the prior art, a primary object of the present invention is to provide a vehicle suspension system that allows attention eliciting information to be conveyed to the vehicle operator substantially without detracting from the performance of the vehicle suspension system.

The present invention achieves such objects by providing a vehicle suspension system (3), comprising; an actuator (7) interposed between a sprung member (8) and an unsprung member (9) of a vehicle (1) to cause a relative displacement by applying a drive force; an information acquiring unit (38, 42) for acquiring vehicle information on a condition of the vehicle and/or road surface information on a condition of a road surface on which the vehicle is traveling; and a control unit (10) for determining if a prescribed warning condition exists according to the vehicle information and/or the road surface information acquired by the information acquiring unit, and performing a warning control including an extending and retracting movement of the actuator at a prescribed frequency when the warning condition is determined.

Thereby, when the warning condition exists, the actuator causes the sprung member to vibrate so that the vehicle operator is enabled to detect the existence of the warning condition from the vibration of the sprung member.

Preferably, the information acquiring unit (38) is configured to acquire vibration information of the unsprung member, and the control unit determines an existence of the warning condition when the vibration information of the unsprung member indicates that a wheel of the vehicle is traveling on an attention eliciting feature of the road surface.

Thereby, when the wheel of the vehicle passes an attention eliciting feature of the road surface, the actuator causes the sprung member to vibrate so that the vehicle operator is able to detect that the vehicle is traveling on the attention eliciting feature from the vibration of the sprung member.

Preferably, the information acquiring unit (42) is configured to acquire road surface image information, and the control unit determines an existence of the warning condition when the road surface image information indicates that a wheel of the vehicle is traveling near or on an attention eliciting display provided on the road surface.

Owing to this arrangement, when the wheel of the vehicle approaches or passes a road surface display, the actuator vibrates the sprung member so that the vehicle operator is able to detect that the vehicle is approaching or traveling on the attention eliciting display on the road surface from the vibration of the sprung member. Because the road surface display is detected by an onboard camera, even when the road surface is smooth and even before the vehicle travels on the road surface display, the vehicle operator's attention may be elicited for a desired purpose.

Preferably, the actuator and the information acquiring unit are provided on each of at least two wheels, and the control unit is configured to detect the warning condition for each of the wheels, and perform the warning control on the actuator or the actuators corresponding to the wheel or wheels for which the warning condition is detected.

Thereby, the vehicle operator is enabled to detect via which of the wheels the attention is elicited.

In this invention, the control unit may be configured to change at least one of a vibration pattern, a vibration frequency and a vibration amplitude of the actuator under the warning control according to the vehicle information and/or the road surface information.

Thereby, the vehicle operator may be enabled to identify a plurality of kinds of attention that is elicited according to the vehicle information and/or the existing road surface information.

According to a preferred embodiment of the present invention, the suspension system further comprises a spring member urging the sprung member and the unsprung member away from each other, wherein the information acquiring device is configured to acquire extension information of the actuator, and determine an existence of the warning condition when a retraction stroke of the actuator is greater than a prescribed value.

Owing to this arrangement, an excessive loading condition (due to an excessive cargo load) or an excessive uneven loading of the vehicle (by cargo and/or passengers that are being carried on the vehicle) can be notified to the vehicle operator via the vibration of the sprung member.

Preferably, the actuator and the information acquiring unit are provided on each of at least two wheels, and the control unit is configured to detect the warning condition for each of the wheels, and perform the warning control on the actuator or the actuators corresponding to the wheel or wheels for which the warning condition is detected.

Thereby, the vehicle operator is enabled to detect the position where the overloading of the vehicle and/or the uneven loading of the vehicle is caused.

The control unit may be configured to determine an existence of the warning condition when a sum of retraction strokes of the actuators is greater than a prescribed value.

Thereby, the vehicle operator may be notified of an excessive loading of the vehicle by the actuator.

In a preferred embodiment of the present invention, the actuator is configured to cause a relative movement between the sprung member and the unsprung member by applying a drive force, and attenuate a relative movement between the sprung member and the unsprung member by applying a damping force.

Thereby, the actuator can perform the function of a damper as well.

According to the present invention, in a vehicle suspension system provided with an actuator, the vehicle operator's attention can be elicited in a reliable manner.

DESCRIPTION OF THE PREFERRED EMBODIMENT(S)

Embodiments of a vehicle suspension system according to the present invention are described in the following with reference to the appended drawings.

Figure 1:
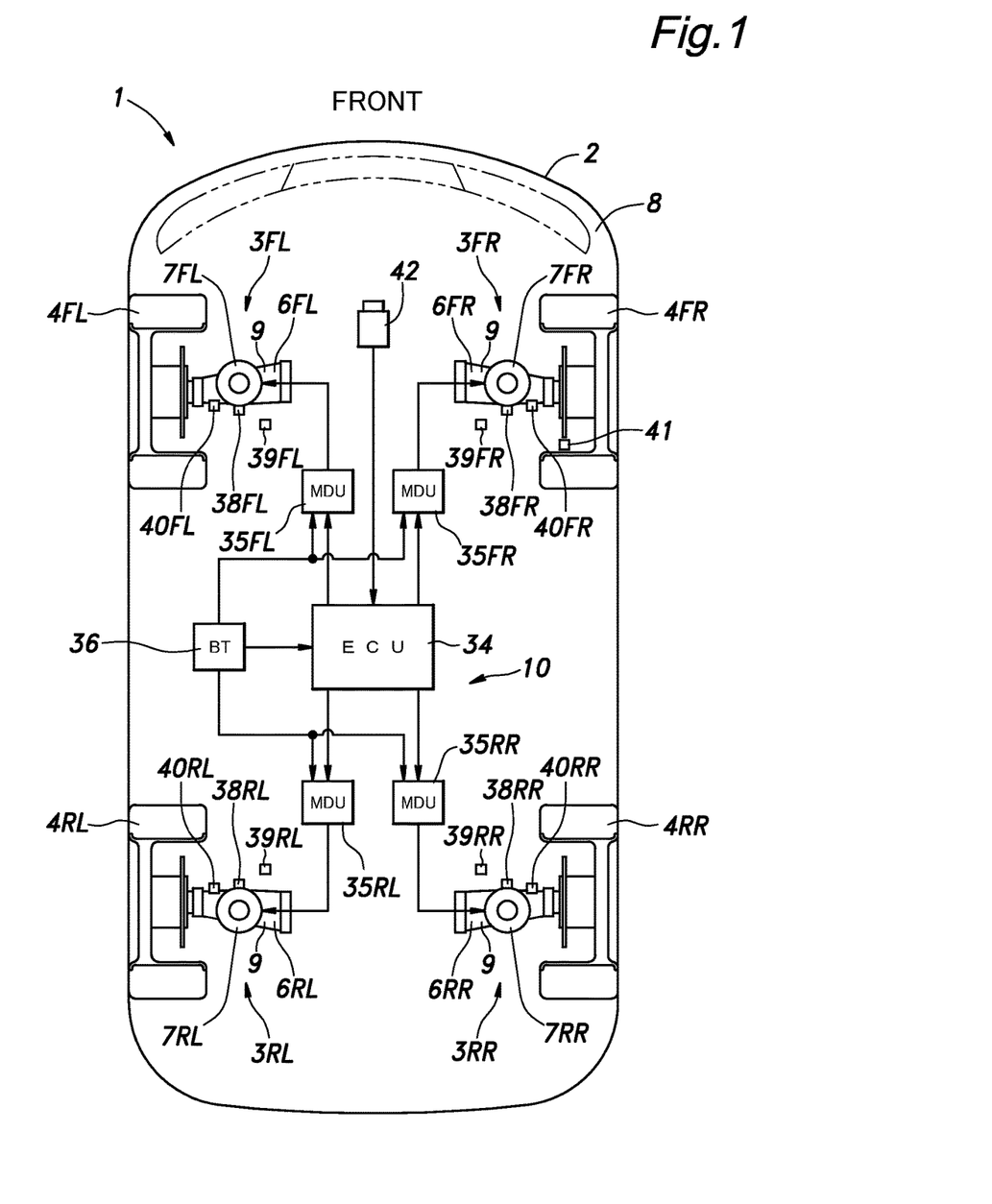
FIG. 1 is a diagram of the overall structure of a vehicle fitted with a suspension system of an embodiment of the present invention.

As shown in FIG. 1, a four-wheel vehicle 1 fitted with a suspension system embodying the present invention includes a vehicle body 2, suspension systems 3 supported by the vehicle body 2 and wheels 4 supported by the respective suspension systems 3. The suspension systems 3 and the associated wheels 4 are provided in four separate locations of the vehicle body 2, and are each distinguished from one another by adding a suffix FR, FL, RR, RL after the numeral denoting each particular component. These suffixes may be omitted when they are collectively discussed in the following description.

The suspension system 3 is pivotally supported by the vehicle body 2, and includes a suspension arm 6 supporting the wheel 4 via a knuckle (not shown in the drawings), and an actuator 7 interposed between a free end part of the suspension arm 6 or the knuckle and the vehicle body 2. The major part of the vehicle body 2 connected to the upper end of the actuator 7 is referred to as a sprung member 8, and the part of the vehicle body 2 and the wheel 4 connected to the lower end of the actuator 7 is referred to as an unsprung member 9.

The actuator 7 is configured to selectively provide a drive force (thrust force) that acts between the sprung member 8 and the unsprung member 9 under the control of a control unit 10. The actuator 7 may consist of, not exclusive, an electromagnetic damper that extends and retracts under the power of an electric motor 20, a hydraulic cylinder that extends and retracts under the oil pressure supplied by an electric pump to a pair of chambers defined therein, or a pneumatic cylinder that extends and retracts under the air pressure supplied by an electric pump to a pair of chambers defined therein. In the illustrated embodiment, the actuator 7 consists of an electromagnetic damper which causes a relative displacement between the sprung member 8 and the unsprung member 9 by providing a drive force (thrust force), and can also supply a damping force between the sprung member 8 and the unsprung member 9 to attenuate the relative displacement between the sprung member 8 and the unsprung member 9.

Figure 2:
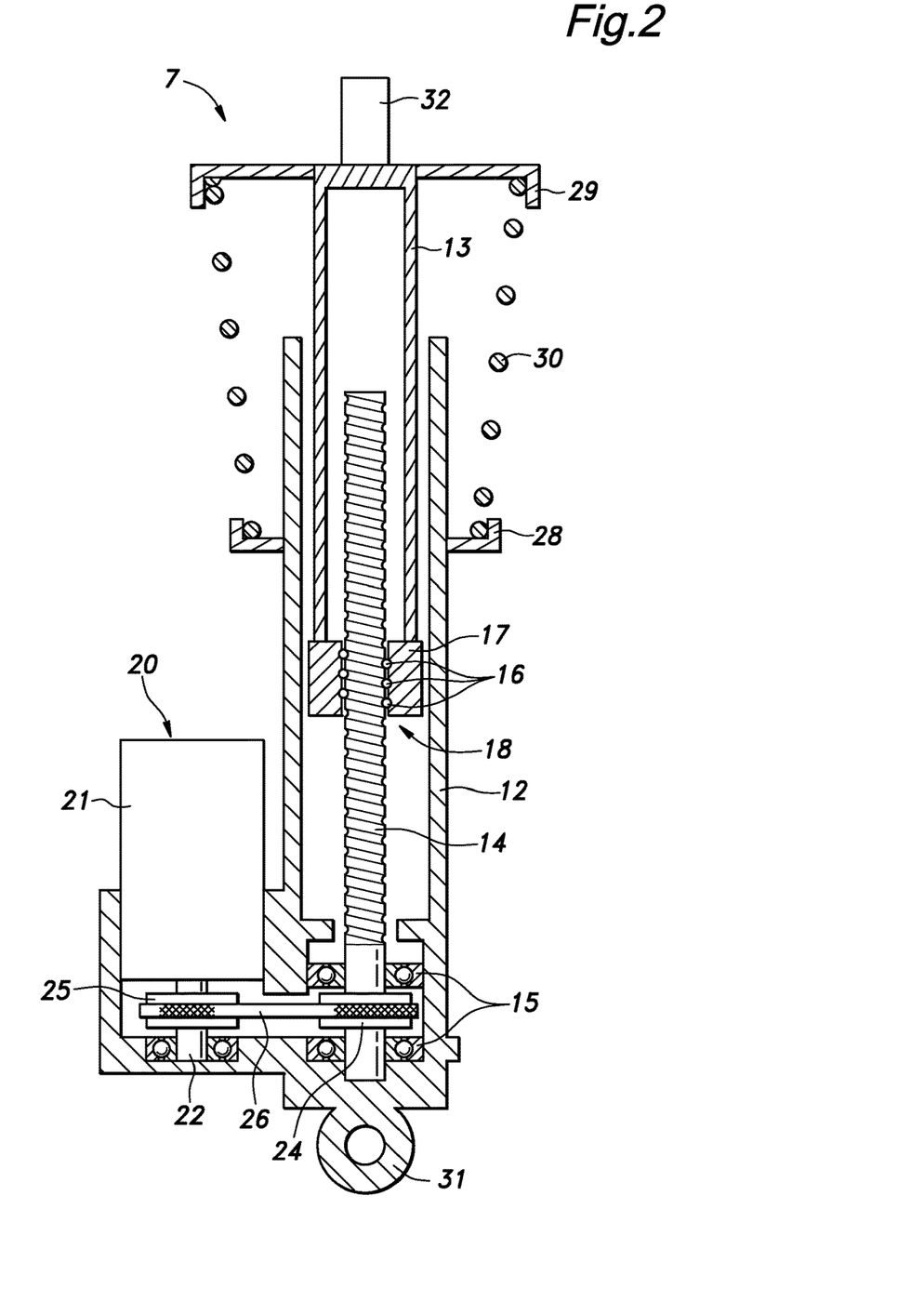
FIG. 2 is a sectional view of an actuator of the suspension system.

As shown in FIG. 2, the actuator 7 includes a cylindrical outer tube 12 and a cylindrical inner tube 13 having one end inserted into the outer tube 12. The inner tube 13 is arranged coaxially with the outer tube 12 and is displaceable in the axial direction with respect to the outer tube 12. The outer tube 12 and the inner tube 13 have mutually cooperating stoppers (not shown) so that the relative displacement range along the axial direction is restricted within a predetermined range, and the relative rotation around the axial line is prevented. Inside the outer tube 12, a screw rod 14 is arranged coaxially with the outer tube 12. The screw rod 14 is rotatably supported by the outer tube 12 via bearings 15 at an end remote from the inner tube 13. On the outer peripheral surface of the screw rod 14, a spiral screw groove is formed for receiving a plurality of balls 16. A nut 17 threading with the screw rod 14 via the balls 16 is coupled to the end portion of the inner tube 13 inserted into the outer tube 12. An end portion of the screw rod 14 on the side of the inner tube 13 passes through the nut 17 and extends into the inner tube 13. The screw rod 14, the balls 16, and the nut 17 constitute a ball screw 18.

A housing 21 of an electric motor 20 is attached to an external extension of the outer tube 12 such that an output shaft 22 of the electric motor 20 extends in parallel with the screw rod 14. The electric motor 20 may consist of a per se known motor such as a three-phase brushless motor. The end portion of the screw rod 14 remote from the inner tube 13 is fitted with a first pulley 24, and the output shaft 22 of the electric motor 20 is fitted with a second pulley 25. An endless belt 26 is passed around the first pulley 24 and the second pulley 25. The outer tube 12 is formed with a slot for passing through the endless belt 26.

The outer periphery of an intermediate part of the outer tube 12 is fixedly provided with a first spring seat 28 consisting of a radial flange, and the outer periphery of an upper end part of the inner tube 13 is fixedly provided with a second spring seat 29 consisting of a radial flange. A compression coil spring 30 is interposed between the first spring seat 28 and the second spring seat 29. The compression coil spring 30 is pre-stressed, and normally urges the outer tube 12 and the inner tube 13 away from each other.

An end of the outer tube 12 remote from the inner tube 13 is fitted with a lower mount 31, and an end of the inner tube 13 remote from the outer tube 12 is fitted with an upper mount 32. In the illustrated embodiment, the lower mount 31 is attached to the suspension arm 6, and the upper mount 32 is attached to the vehicle body 2.

When the outer tube 12 and the inner tube 13 are relatively displaced in the axial direction, the screw rod 14 and the nut 17 are relatively displaced in the axial direction of the screw rod 14, and the screw rod 14 rotates as a result. The rotation of the screw rod 14 is transmitted to the output shaft 22 of the electric motor 20 via the first pulley 24, the belt 26, and the second pulley 25 so that the electric motor 20 rotates. Conversely, when the electric motor 20 rotates, the outer tube 12 and the inner tube 13 are relatively displaced in the axial direction. In this manner, the relative displacement in the axial direction of the outer tube 12 and the inner tube 13, or the extension and retraction of the actuator 7, and the rotation of the motor 20 are interchangeable. When the electric motor 20 rotates by the extension and retraction of the actuator 7, an electromotive force is induced so that rotational resistance corresponding to the induced electromotive force is generated. Therefore, a damping force is generated against the extension and retraction of the actuator 7. In addition, when the electric motor 20 is rotated by external electric power, the actuator 7 generates a drive force in the extending direction or the retracting direction in a corresponding manner, causing the actuator 7 to extend or retract as the case may be. The drive force and the damping force generated by the actuator 7 can be controlled by electric power supplied to the electric motor 20.

The control unit 10 of the vehicle 1 is provided with one ECU 34 (electronic control unit) and four MDUs 35 (motor drive unit) connected to the ECU 34 for controlling the respective actuators 7. Thus, each actuator 7 is controlled by the corresponding MDU 35. An onboard battery 36 supplies electric power to the MDUs 35. The ECU 34 includes a microcomputer, ROM, RAM, a peripheral circuit, an input/output interface, and various vehicle operators. Each of the MDUs 35 is composed of a switching circuit including a switching device that controls electric power to be supplied to each actuator 7 under the command of the ECU 34.

The ECU 34 receives the output signals from a stroke sensor 38, a sprung member acceleration sensor 39, an unsprung member acceleration sensor 40, a vehicle speed sensor 41, and an onboard camera 42.

The stroke sensor 38 is provided for each actuator 7 and is configured to detect the relative position of the outer tube 12 and the inner tube 13, or a stroke XS (the extended and retracted state, a length) of the actuator 7, and provides a signal corresponding to the XS to the ECU 34. The sprung member acceleration sensor 39 is configured to detect a sprung member acceleration GU, or a vertical acceleration of a portion of the sprung member 8 (vehicle body 2) corresponding to each wheel 4, and provides a signal corresponding to the sprung member acceleration GU to the ECU 34. The unsprung member acceleration sensor 40 is configured to detect an unsprung member acceleration GL, or a vertical acceleration of the unsprung member 9 (the suspension arm 6), and provides a signal corresponding to the unsprung member acceleration GL to the ECU 34. The vehicle speed sensor 41 is configured to detect a vehicle speed V, and provides a signal corresponding to the rotational speed of the wheel 4 to the ECU 34. The onboard camera 42 is a camera for capturing the image of the road surface ahead of the vehicle 1, and supplies road surface image information CI to the ECU 34.

Based on the signals from the respective sensors, the ECU 34 computes a target load FT of the actuator 7 for each actuator 7 and a target current value IT to be supplied to the electric motor 20 of each actuator 7 based on the target load FT. Each MDU 35 performs a PWM control for the corresponding electric motor 20 based on the target current value IT and supplies a corresponding target current to the electric motor 20 of each actuator 7.

Figure 3:
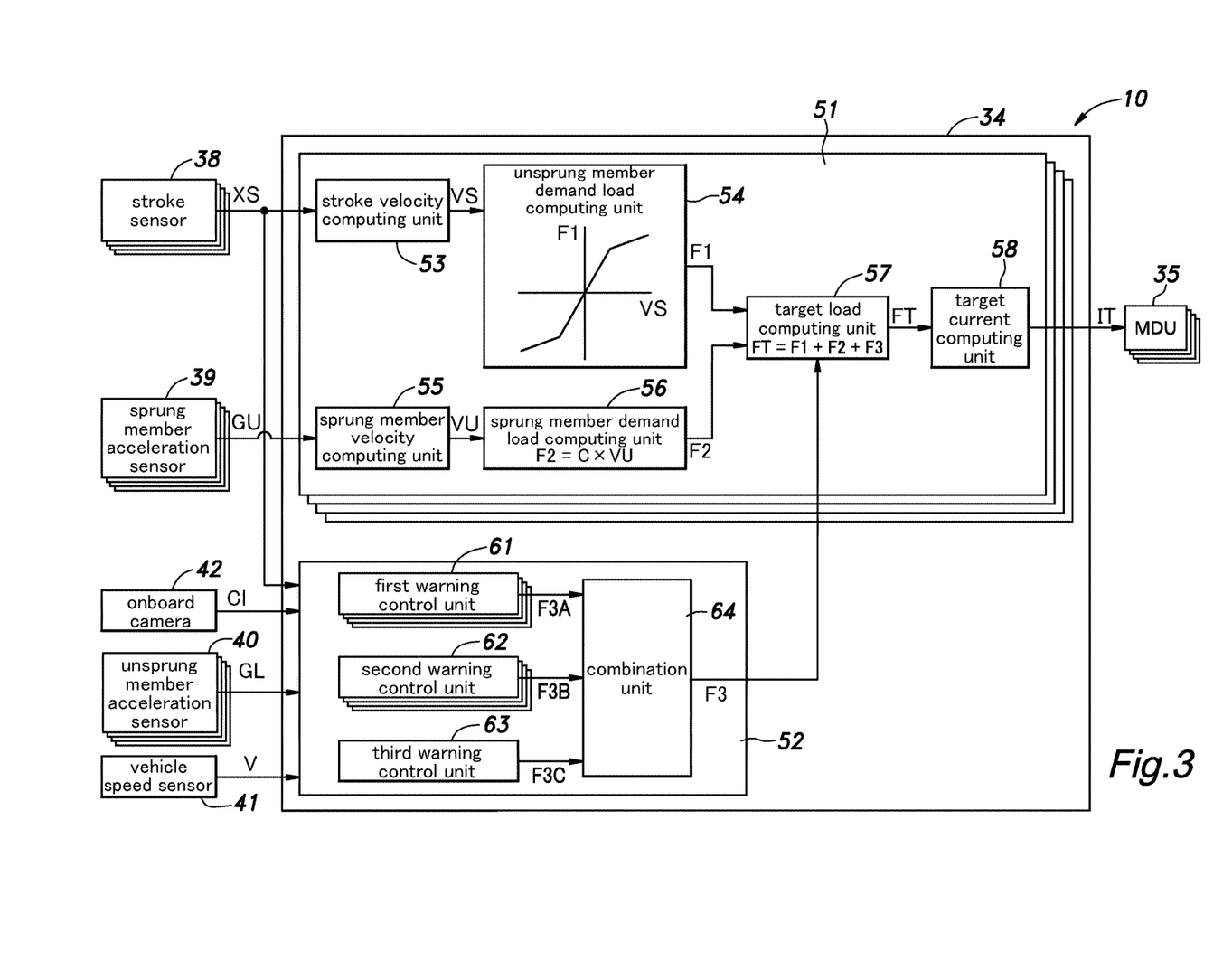
FIG. 3 is a block diagram of a control unit of the suspension system.

FIG. 3 shows a functional block diagram of the ECU 34. As shown in FIG. 3, the ECU 34 includes an output control unit 51 provided for each actuator 7 so as to control the corresponding actuator 7. Each output control unit 51 includes a stroke velocity computing unit 53, an unsprung member demand load computing unit 54, a sprung member velocity computing unit 55, a sprung member demand load computing unit 56, a target load computing unit 57, and a target current computing unit 58.

The stroke velocity computing unit 53 computes the stroke velocity VS of the actuator 7 by differentiating the stroke XS received from the corresponding stroke sensor 38 with time. The unsprung member demand load computing unit 54 computes an unsprung member demand load F1 in order to reduce the vibration of the unsprung member 9 by damping the extension and retraction movement of the actuator 7. The unsprung member demand load computing unit 54 sets an unsprung member demand load F1 by looking up a predetermined map based on the stroke velocity VS received from the stroke velocity computing unit 53. The map defines the relationship between the stroke velocity VS and the unsprung member demand load F1 in such a manner that the greater the stroke velocity VS in the retracting direction is, the greater the load produced by the actuator 7 in the extending direction is, and the greater the stroke velocity VS in the extending direction is, the greater the load produced by the actuator 7 in the retracting direction is. In other words, the greater the stroke velocity VS is, the greater the damping force (resistive force) produced by the actuator 7 becomes.

The sprung member velocity computing unit 55 computes the sprung member velocity VU or the vertical velocity of the sprung member 8 by integrating the sprung member acceleration GU received from the corresponding sprung member acceleration sensor 39 with time. The sprung member demand load computing unit 56 computes a sprung member demand load F2 so as to suppress the vibration of the sprung member 8 based on the skyhook theory. The sprung member demand load computing unit 56 computes the sprung member demand load F2 by multiplying the sprung member velocity VU received from the sprung member velocity computing unit 55 by a sprung member gain (skyhook gain) C set in advance. The sprung member demand load F2 is set so that the greater the sprung member velocity VU in the upward direction is, the greater the force (drive force) produced by the actuator 7 in the retracting direction is, and the greater the sprung member velocity VU in the downward direction is, the greater the force (drive force) produced by the actuator 7 in the extending direction is.

The target load computing unit 57 adds the unsprung member demand load F1 received from the unsprung member demand load computing unit 54 to the sprung member demand load F2 received from the sprung member demand load computing unit 56, and adds a warning demand load F3 received from a warning control unit 52 (which will be described hereinafter) to the sum to compute the target load FT of the actuator 7. The target current computing unit 58 computes the target current value IT corresponding to the target load FT by referring to a map which defines the relationship between the predetermined target load FT and the target current value IT, and forwards the target current value IT to the corresponding MDU 35. The MDU 35 supplies electric current corresponding to the target current value IT to the corresponding actuator 7. For example, the MDU 35 determines a duty ratio corresponding to the target current value IT, and controls the switching device according to the duty ratio.

The warning control unit 52 determines if the vehicle 1 is in any of a first to third warning conditions, and when the vehicle 1 is in any of the first to third warning conditions, supplies a warning demand load F3 to the target load computing unit 57 corresponding to the prescribed actuator 7 to cause the designated actuator 7 to perform a warning operation. The first warning condition corresponds to a state in which the wheel 4 is passing an attention eliciting feature typically consisting of road surface irregularities such as rumble strips and bumps provided on the road surface. The second warning condition corresponds to a state where the wheel is approaching or passing a road surface display typically consisting of a road center line and a road side marker line provided on the road surface. The third warning condition corresponds to a state in which the loading of the cargo carried by the vehicle is uneven or the loading of the cargo is beyond an upper limit. The warning control unit 52 of the illustrated embodiment includes a first warning control unit 61 that generates a first warning demand load F3A in the case of the first warning condition, a second warning control unit 62 that generates a second warning demand load F3B in the case of the second warning condition, and a third warning demand load F3C in the case of the third warning condition, and a combination unit 64 for generating a warning demand load F3 based on the first to third warning demand loads F3A to F3C.

The first warning control unit 61 detects a vibration condition of the actuator according to the stroke XS received from the stroke sensor 38, and determines that the first warning condition exists by analyzing if the vibration condition of the actuator 7 matches a prescribed determination pattern. If the first warning condition is determined, the first warning demand load F3A is generated. In an alternate embodiment, the first warning control unit 61 detects the vibration condition of the unsprung member 9 from the unsprung member acceleration GL received from the unsprung member acceleration sensor 40, and determines that the first warning condition exists by analyzing if the vibration condition of the actuator 7 matches the prescribed determination pattern. If the first warning condition is determined, the first warning demand load F3A is generated.

Figure 4:
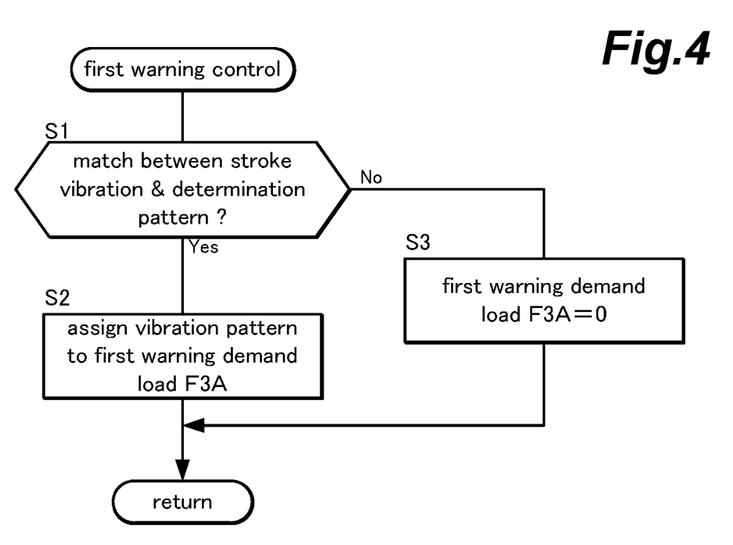
FIG. 4 is a flowchart of a first warming control.

Referring to FIG. 4, the process of the first warning control executed by the first warning control unit 61 is described in the following. The first warning control shown in FIG. 4 is executed for each of the actuators 7. In step S1, it is determined if the vibration pattern of the stroke XS matches the prescribed determination pattern. More specifically, it is determined if the number of events where the stroke XS exceeds a prescribed threshold value has exceeded a prescribed number in a prescribed time period, and if this determination result is Yes, it is determined that the vibration pattern of the stroke XS matches the prescribed determination pattern. Alternatively, the amplitude and frequency of the stroke XS of the actuator 7 are computed, and it is determined if the amplitude is greater than a prescribed amplitude determination value and the frequency is higher than a prescribed frequency determination value. If this determination result is Yes, it is determined that the vibration pattern of the stroke XS matches the prescribed determination pattern.

If the determination result of step S1 is No, the first warning demand load F3A is set to zero in step S2. If the determination result of step S1 is Yes, a prescribed vibration pattern is assigned to the first warning demand load F3A. The vibration pattern that is assigned to the first warning demand load F3A may be varied depending on at least one of the amplitude, the frequency and the vibration pattern of the stroke XS. For instance, the greater the amplitude of the stroke XS is, the greater the amplitude of the vibration pattern assigned to the first warning demand load F3A may become. Additionally or alternatively, the higher the frequency of the stroke XS is, the higher the frequency of the vibration pattern assigned to the first warning demand load F3A may become. Also, when the amplitude of the stroke XS is greater than a prescribed determination value, the vibration pattern assigned to the first warning demand load F3A may be given with a special rhythmic pattern. Once the first warning demand load F3A is assigned in step S2 or step S3, the program flow returns to the main routine.

Figure 5:
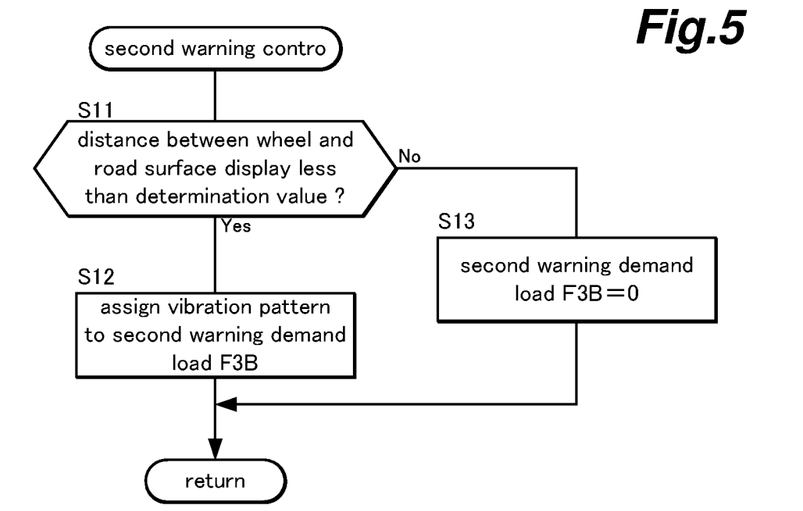
FIG. 5 is a flowchart of a second warming control.

Referring to FIG. 5, the process of the second warning control executed by the second warning control unit 62 is described in the following. The second warning control shown in FIG. 5 is executed for each of the actuators 7. In step S11, it is determined that the distance between the wheel 4 corresponding to the actuator 7 and a road surface display is less than a prescribed determination value. In the illustrated embodiment, the road surface display that is to be detected may consist of a center line or a road side marker line. For instance, relative position information on a road surface display in the image is acquired from road surface image information CI, and the distance between the wheel 4 corresponding to the actuator 7 and the road surface display can be computed by looking up a map defining relative position information of a road surface display and the distance between the corresponding wheel 4 and the road surface display.

If the determination result of step S11 is No, the second warning demand load F3B is set to zero in step S13. If the determination result of step S11 is Yes, a prescribed vibration pattern is assigned to the second warning demand load F3B in step S12. The vibration pattern that may be assigned to the second warning demand load F3B may be varied depending on the distance between the wheel 4 corresponding to the actuator 7 and the road surface display. For instance, the amplitude and the frequency of the vibration pattern assigned to the second warning demand load F3B may be increased with a decrease in the distance between the wheel 4 corresponding to the actuator 7 and the road surface display. Also, when distance between the wheel 4 corresponding to the actuator 7 and the road surface display is less than a prescribed value, the vibration patter assigned to the second warning demand load F3B may be given with a special rhythmic pattern. Once the second warning demand load F3B is assigned in step S5 or step S6, the program flow returns to the main routine.

Figure 6:
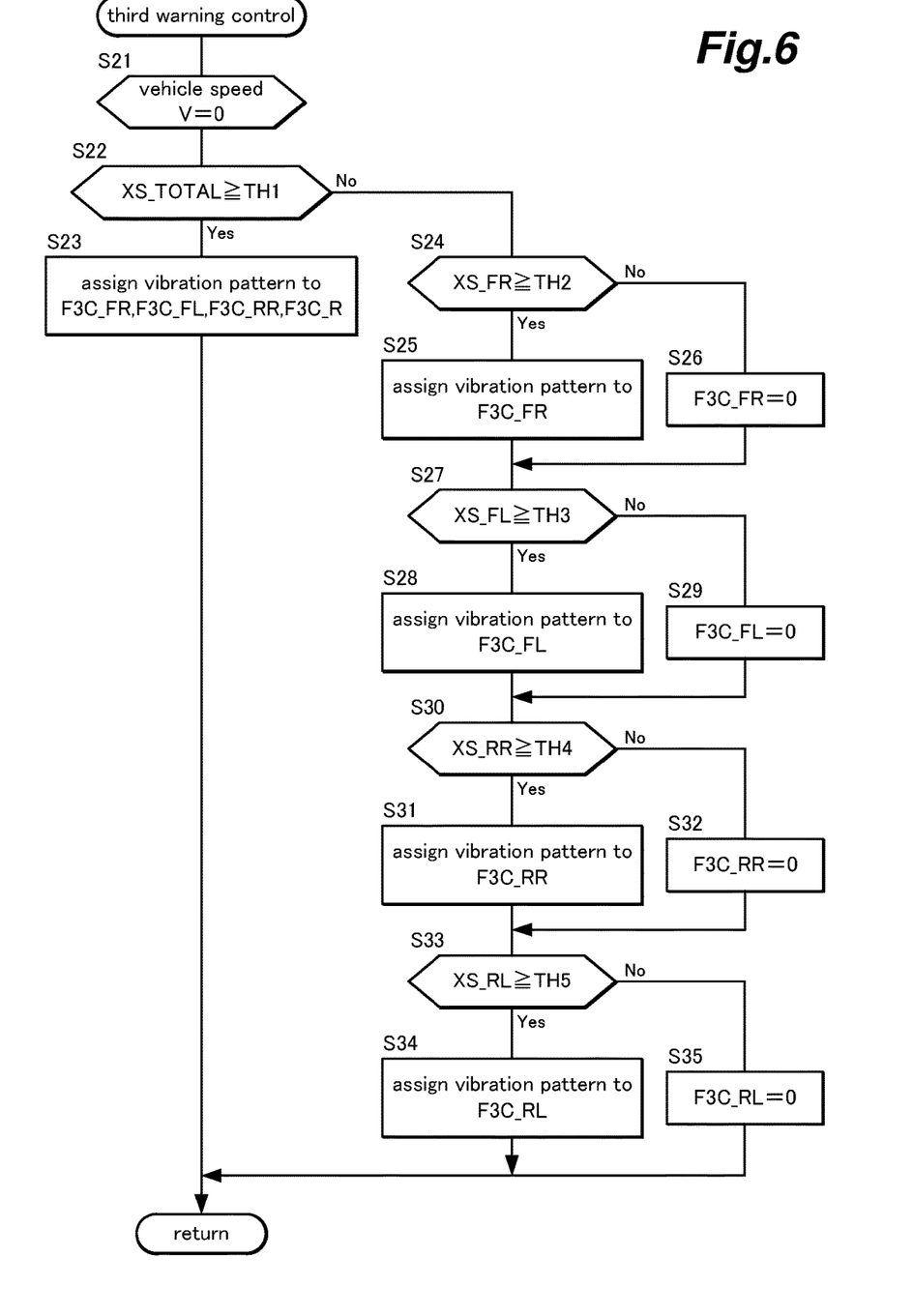
FIG. 6 is a flowchart of a third warming control.

Referring to FIG. 6, the process of the third warning control executed by the third warning control unit 63 is described in the following. The third warning control shown in FIG. 6 is executed commonly for all of the actuators 7. In step S21, it is determined that the vehicle speed V is zero according to the vehicle speed V received from the vehicle speed sensor 41. If the determination result of step S21 is No, the program flow returns to the main routine. If the determination result of step S21 is Yes, the program flow advances to step S22. Thus, the process in steps S22 to S34 is performed while the vehicle 1 is stationary as determined in step S21.

In step S22, a front right stroke XS_FR received from the front right stroke sensor 38FR, a front left stroke XS_FL received from the front left stroke sensor 38FL, a rear right stroke XS_RR received from the rear right stroke sensor 38RR, and a rear left stroke XS_RL received from the rear left stroke sensor 38RL are summed up to obtain a total stroke XS_TOTAL. Then, it is determined that the total stroke XS_TOTAL is equal to or greater than a predetermined determination value TH1. The fact that the total stroke XS_TOTAL is equal to or greater than the determination value TH1 indicates that the total load amount (including vehicle occupants) of the vehicle 1 is equal to or greater than a predetermined value. If the determination result in step S22 is Yes, the program flow proceeds to step S23, and a predetermined vibration pattern is set to each of the third warning demand loads F3C_FR, F3C_FL, F3C_RR and F3C_RL corresponding to the respective actuators 7. After the process of step S23 is executed, the program flow returns to the main routine.

If the determination result in step S22 is No, the program flow proceeds to step S24. In step S24, it is determined that the stroke XS_FR of the front right actuator 7FR is equal to or greater than a predetermined determination value TH2. The determination value TH2 is set to a value smaller than the determination value TH1. When the stroke XS_FR of the front right actuator 7FR is equal to or greater than the determination value TH2, the load applied to the front right portion of the vehicle body 2 or, in other words, the weight of the cargo transmitted to the front right portion of the vehicle body 2 is equal to or greater than a predetermined value so that it can be concluded that an uneven load is being applied to the front right part of the vehicle 1. When the determination result in step S24 is Yes, a predetermined vibration pattern is set to the front right third warning demand load F3C_FR corresponding to the front right actuator 7FR in step S25. When the determination result in step S24 is No, 0 is set to the front right third warning demand load F3C_FR in step S26. Once the process of step S25 or step S26 is completed, the program flow proceeds to step S27.

In step S27, it is determined that the stroke XS_FL of the front left actuator 7FL is equal to or greater than a predetermined determination value TH3. The determination value TH3 is set to a value smaller than the determination value TH1. When the stroke XS_FL of the front left actuator 7FL is equal to or greater than the determination value TH3, the load applied to the front left portion of the vehicle body 2 or, in other words, the weight of the cargo transmitted to the front left portion of the vehicle body 2 is equal to or greater than a predetermined value so that it can be concluded that an uneven load is being applied to the front left part of the vehicle 1. When the determination result in step S27 is Yes, a predetermined vibration pattern is set to the front left third warning demand load F3C_FL corresponding to the front left actuator 7FL in step S28. When the determination result in step S27 is No, 0 is set to the front left third warning demand load F3C_FL in step S29. Once the process of step S28 or step S29 is completed, the program flow proceeds to step S30.

In step S30, it is determined that the stroke XS_RR of the rear right actuator 7RR is equal to or greater than a predetermined determination value TH4. The determination value TH4 is set to a value smaller than the determination value TH1. When the stroke XS_RR of the rear right actuator 7RR is equal to or greater than the determination value TH4, the load applied to the rear right portion of the vehicle body 2 or, in other words, the weight of the cargo transmitted to the rear right portion of the vehicle body 2 is equal to or greater than a predetermined value so that it can be concluded that an uneven load is being applied to the rear right part of the vehicle 1. When the determination result in step S30 is Yes, a predetermined vibration pattern is set to the rear right third warning demand load F3C_RR corresponding to the rear right actuator 7RR in step S31. When the determination result in step S30 is No, 0 is set to the rear right third warning demand load F3C_RR in step S32. Once the process of step S31 or step S32 is completed, the program flow proceeds to step S33.

In step S33, it is determined that the stroke XS_RL of the rear left actuator 7RL is equal to or greater than a predetermined determination value TH5. The determination value TH5 is set to a value smaller than the determination value TH1. When the stroke XS_RL of the rear left actuator 7RL is equal to or greater than the determination value TH5, the load applied to the rear left portion of the vehicle body 2 or, in other words, the weight of the cargo transmitted to the rear left portion of the vehicle body 2 is equal to or greater than a predetermined value so that it can be concluded that an uneven load is being applied to the rear left part of the vehicle 1. When the determination result in step S33 is Yes, a predetermined vibration pattern is set to the rear left third warning demand load F3C_RL corresponding to the rear left actuator 7RL in step S34. When the determination result in step S33 is No, 0 is set to the rear left third warning demand load F3C_RL in step S35. Once the process of step S34 or step S35 is completed, the program flow returns to the main routine.

Owing to the third warning control discussed above, when the vehicle is overloaded with cargo (and/or vehicle occupants), the vibration pattern is assigned to the front left third warning demand load F3C_FL, the front right third warning demand load F3C_FR, the rear left third warning demand load F3C_RL and the rear right third warning demand load F3C_RR. When the load is applied unevenly to the vehicle, the vibration pattern is assigned to the third warning demand load F3C for the actuator 7 corresponding to the heavily loaded part of the vehicle.

The determination values TH2 to TH5 may be selected freely by taking into account the properties and the positions of the respective actuators 7. For instance, the determination values TH2 to TH5 may be a same value. It is also possible to select such that the determination values TH2 and TH3 for the front wheels 4 are a same value, and the determination values TH4 and TH5 for the rear wheels 4 are a same value which however is different from the value for the front wheels.

The combination unit 64 assigns a warning demand load F3 for each of the actuators 7 according to the first to third warning demand loads F3A to F3C determined for each actuator 7. The combination unit 64 may, for instance, simply sum up the first to third warning demand loads F3A to F3C to determine the warning demand load F3. Alternatively, different priority levels may be assigned to the first to third warning demand loads F3A to F3C, and one of them may be selected for the warning demand load F3 according to a prescribed rule. It is also possible to multiply prescribed coefficients to the first to third warning demand loads F3A to F3C, and sum up the products to determine the warning demand load F3.

In the illustrated embodiment, when both the first warning demand load F3A and the second warning demand load F3B are not 0, the combination unit 64 sets the first warning demand load F3A as the warning demand load F3. When the first warning demand load F3A is 0 and the second warning demand load F3B is not 0, the second warning demand load F3B is set as the warning demand load F3. When the third warning demand load F3C is not 0, the third warning demand load F3C is set as the warning demand load F3. When the third warning demand load F3C is not 0, since the vehicle speed V is 0, the first and second warning demand loads F3A and F3B are necessarily 0. The combination unit 64 forwards the obtained warning demand load F3 to the target load computing unit 57.

The advantages of the suspension system 3 described above are discussed in the following. In the suspension system 3 of the illustrated embodiment, each of the actuators 7 is controlled based on the unsprung member demand load F1 for suppressing the vertical vibration of the unsprung member 9 and the sprung member demand load F2 for suppressing the vertical displacement of the sprung member 8 so that both the road surface tracking performance of the wheel 4 and the ride quality of the vehicle 1 can be improved. Further, when any one of the first to third warning conditions occurs, since the first to third warning demand loads F3A to F3C are added to the sum of the unsprung member demand load F1 and the sprung member demand load F2 in determining the target load of each actuator 7, a vibration corresponding to the first to third warning demand loads F3A to F3C is generated in the sprung member 8. As a result, the vehicle operator can sense the occurrence of the first to third warning conditions from the vibration of the sprung member 8.

According to the first warning control unit 61, even while the control for suppressing the vertical vibration of the sprung member 8 is being executed, if the wheel 4 of the vehicle 1 passes an attention eliciting feature of the road surface, the actuator 7 causes the sprung member 8 to vibrate in a prescribed pattern so that the vehicle operator is enabled to perceive from the vibration of the sprung member 8 that the vehicle 1 is traveling on the attention eliciting feature. In addition, since only the actuator 7 corresponding to the wheel 4 passing the attention eliciting feature vibrates, the vehicle operator can recognize which of the wheels 4 is traveling on the attention eliciting feature.

According to the second warning control unit 62, when the wheel 4 of the vehicle 1 approaches or passes a center line or the road side marker line provided on the road surface, the actuator 7 causes the sprung member 8 to vibrate so that the vehicle operator is enabled to sense from the vibration of the sprung member 8 that the vehicle 1 is approaching the road surface display or is traveling on the road surface display. As a result, the vehicle operator can avoid deviation from the current driving lane or prevent it at an early stage. Since the vehicle 1 detects the road surface display with the onboard camera 42, the road surface display can be detected even when the road surface display does not include any surface irregularities, and even before the wheel 4 actually passes the road surface display. Therefore, the vehicle operator may be notified well ahead of actually crossing the road surface display. Furthermore, since only the actuator 7 corresponding to the wheel 4 approaching or passing the road surface vibrates, the vehicle operator can recognize which of the wheels 4 is approaching or passing the road surface display.

According to the third warning control unit 63, when an excessive loading of the vehicle 1 or an excessive unevenness in the loading of the vehicle is detected, the actuator 7 causes the sprung member 8 to vibrate so that the vehicle operator is enabled to sense an existence of a problem. When overloading occurs, all of the actuators 7 vibrate, and when the load is excessively uneven, only the actuator 7 corresponding to the wheel 4 under the heaviest load vibrates, so that the vehicle operator is enable to distinguish the problem if it is an excessive loading of the vehicle or an excessive unevenness in the loading of the vehicle. Also, in the case of an uneven loading of the vehicle 1, the vehicle operator is enabled to recognize which of the wheels 4 is most heavily loaded.

Although the present invention has been described in terms of a preferred embodiment thereof, it is obvious to a person skilled in the art that various alterations and modifications are possible.

The invention claimed is:

1. A vehicle suspension system, comprising;
   an actuator interposed between a sprung member and an unsprung member of a vehicle and applying a drive force to cause a relative displacement between the sprung member and the unsprung member by an extending and retracting movement;
   a sensor acquiring the extending and retracting movement of the actuator;
   an onboard camera acquiring road surface image information; and
   a control unit configured to perform a control including the extending and retracting movement of the actuator, wherein the control unit is configured to:
   compute an unsprung member demand load to reduce vibration of the unsprung member,
   compute a sprung member demand load to suppress vibration of the sprung member,
   determine an existence of a first warning condition when a wheel of the vehicle is passing road surface irregularities including rumble strips and/or bumps provided on the road surface based on the extending and retracting movement of the actuator,
   compute a first warning demand load to perform a first warning control including the extending and retracting movement of the actuator at a first frequency when first the warning condition is determined,
   determine an existence of a second warning condition when the road surface image information indicates that the wheel of the vehicle is traveling near or on a road line provided on the road surface,
   compute a second warning demand load to perform a second warning control including the extending and retracting movement of the actuator at a second frequency when the second warning condition is determined, and
   compute a target load of the actuator based on at least the unsprung member demand load, the sprung member demand load, the first warning demand load, and the second warning demand load.

2. The vehicle suspension system according to claim 1, wherein the control unit is further configured to increase an amplitude and a frequency of a vibration pattern assigned to the second warning demand load with a decrease in a distance between the wheel and the road line.

3. A vehicle suspension system, comprising:
   a plurality of actuators interposed between a sprung member and an unsprung member of a vehicle and corresponding to each of a plurality of wheels of the vehicle, and applying a drive force to cause a relative displacement between the sprung member and the unsprung member by an extending and retracting movement;
   a plurality of spring members interposed between the sprung member and the unsprung member and corresponding to each of the plurality of wheels, and urging the sprung member and the unsprung member away from each other;
   a plurality of sensors provided to each of the plurality of actuators, and acquiring the extending and retracting movement of each of the actuators; and
   a control unit configured to perform a control including the extending and retracting movement of the plurality of actuators, wherein the control unit is configured to change the extending and retracting movement of the actuators i) when a sum of retraction strokes of the plurality of actuators is equal to or greater than a sum determination value, and ii) when the sum of retraction strokes of the plurality of actuators is less than the sum determination value and a retraction stroke of at least one of the plurality of actuators is equal to or greater than a predetermined value.

4. A vehicle suspension system, comprising:
   a plurality of actuators interposed between a sprung member and an unsprung member of a vehicle and corresponding to each of a plurality of wheels of the vehicle, and applying a drive force to cause a relative displacement between the sprung member and the unsprung member by an extending and retracting movement;
   a plurality of spring members interposed between the sprung member and the unsprung member and corresponding to each of the wheels, and urging the sprung member and the unsprung member away from each other;
   a plurality of sensors provided to each of the plurality of actuators, and acquiring the extending and retracting movement of each of the plurality of actuators; and a control unit configured to perform a control including the extending and retracting movement of the plurality of actuators, wherein the control unit is configured to:
- determine an existence of a third warning condition when a retraction stroke of each of the plurality of actuators is greater than a first value,
- perform a third warning control on one or more actuators of the plurality of actuators corresponding to one or more wheels for which the third warning condition is detected,
- determine an existence of a fourth warning condition when a sum of retraction strokes of the plurality of actuators is greater than a second value, and
- perform a fourth warning control on the plurality of actuators.

* * * * *